No. 766,064. PATENTED JULY 26, 1904.
C. W. RICHARDS.
RIVET MAKING MACHINE.
APPLICATION FILED MAY 29, 1903.
NO MODEL. 8 SHEETS—SHEET 1.

WITNESSES:
Edward Thorpe
Isaac B. Owens

INVENTOR
Charles W. Richards
BY
ATTORNEYS.

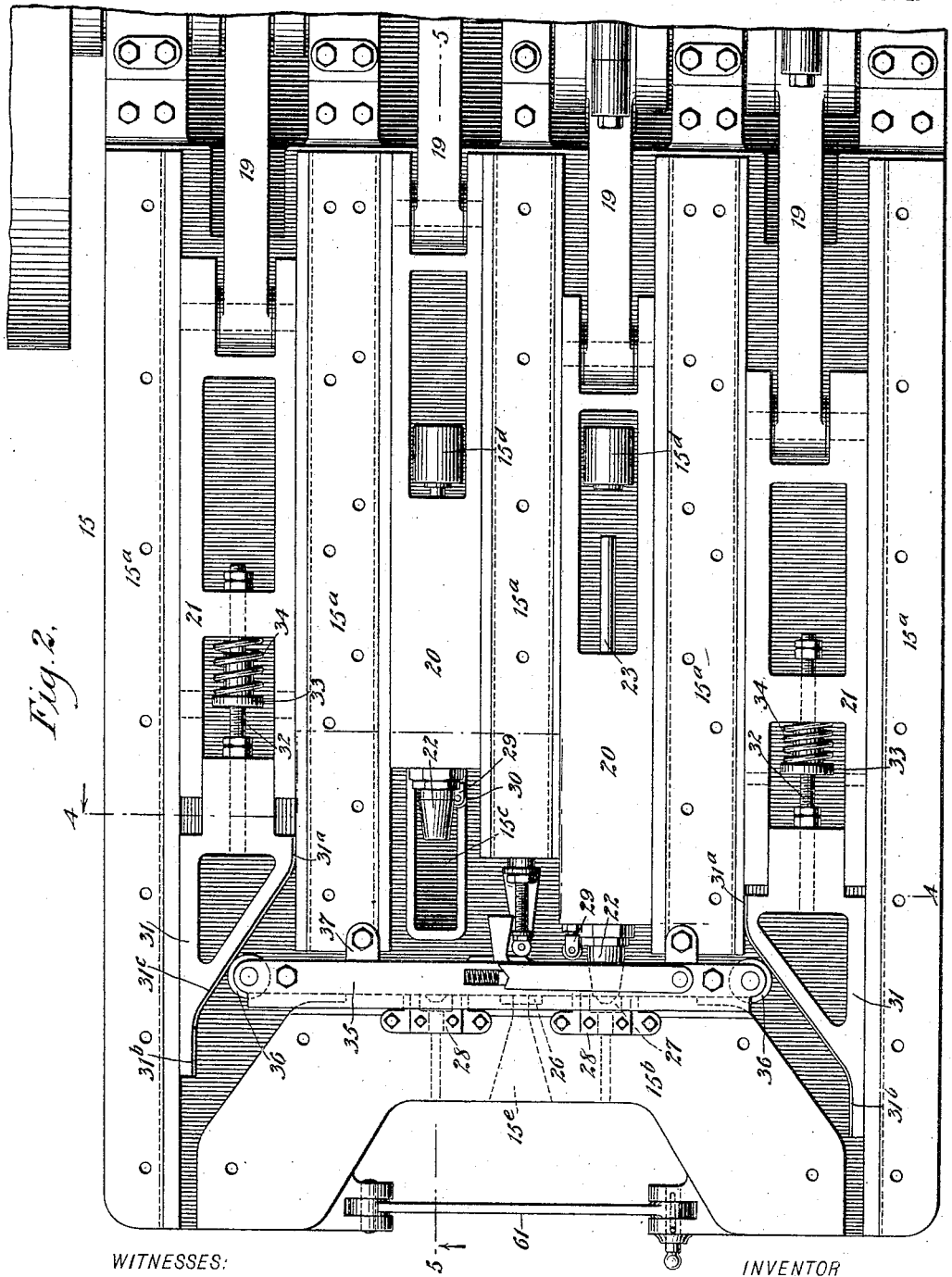

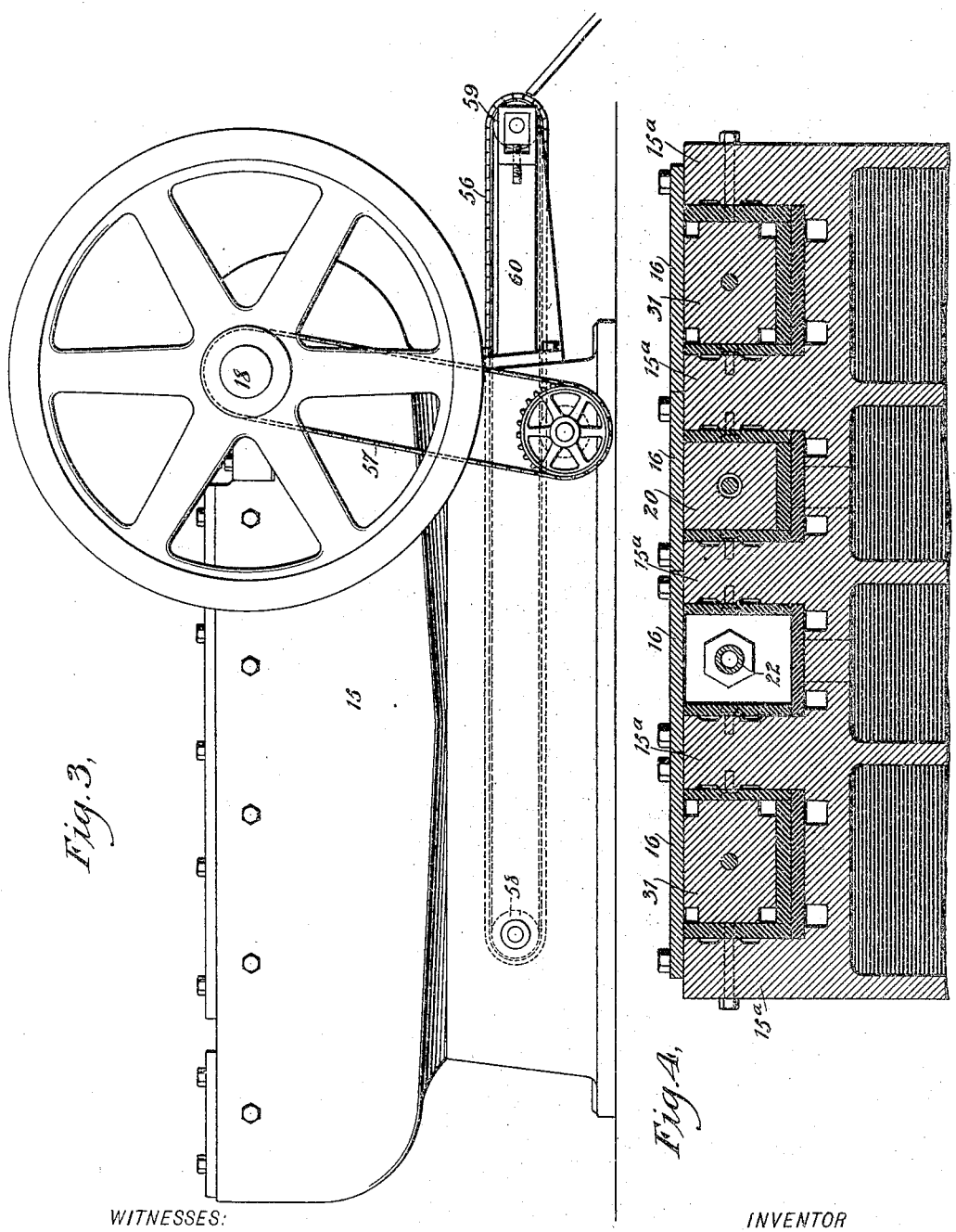

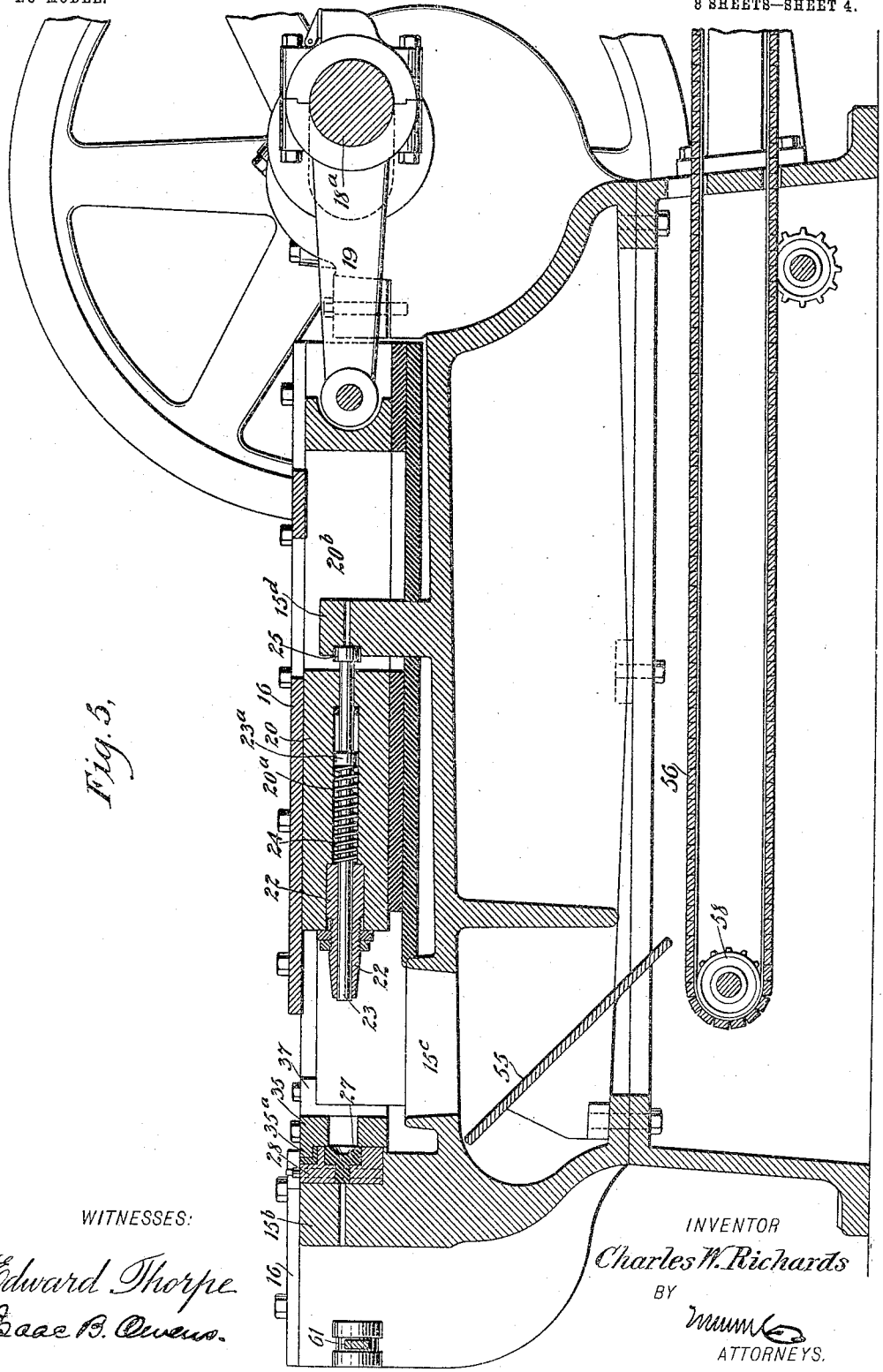

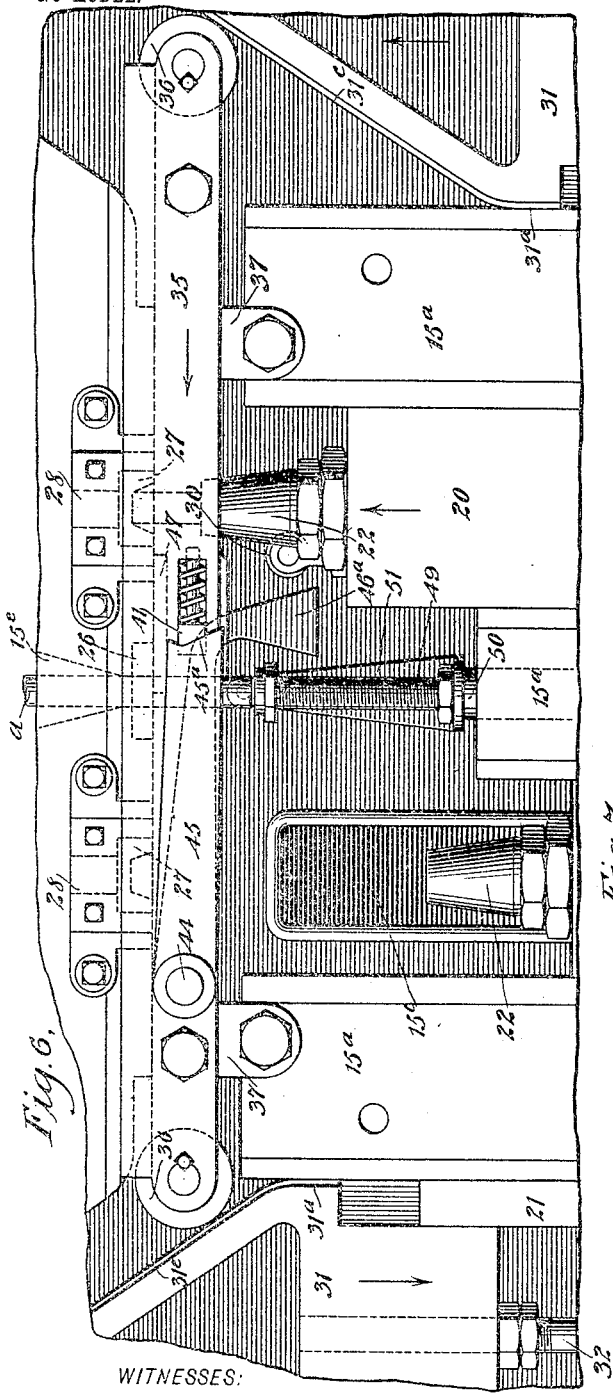
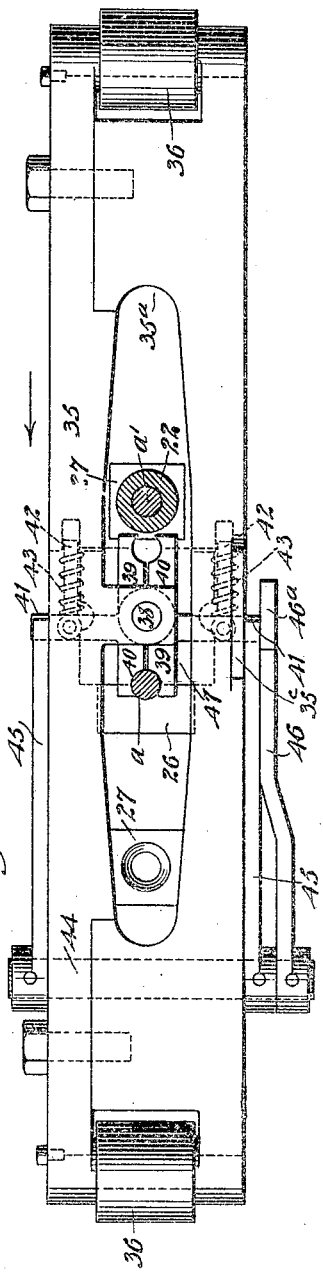

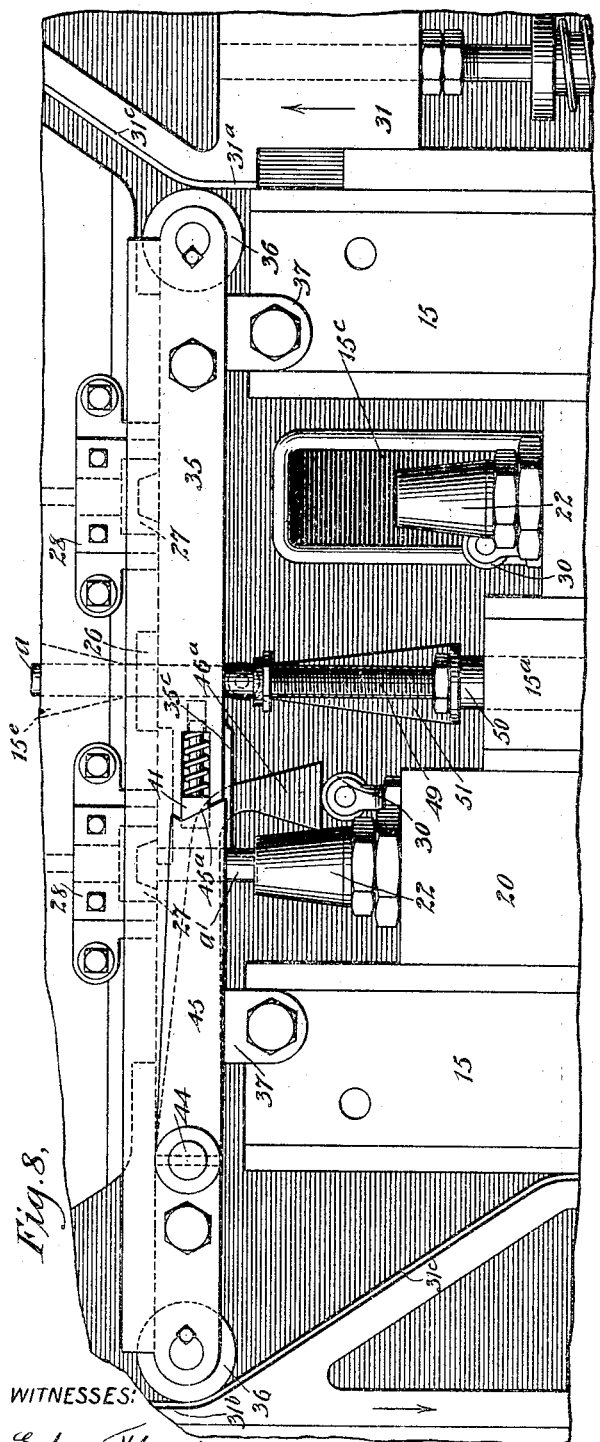

No. 766,064. PATENTED JULY 26, 1904.
C. W. RICHARDS.
RIVET MAKING MACHINE.
APPLICATION FILED MAY 29, 1903.
NO MODEL. 8 SHEETS—SHEET 7.

Fig. 10.

Fig. 11.

WITNESSES:
Edw. Thorpe.
Isaac B. Owens.

INVENTOR
Charles W. Richards
BY
ATTORNEYS.

No. 766,064. PATENTED JULY 26, 1904.
C. W. RICHARDS.
RIVET MAKING MACHINE.
APPLICATION FILED MAY 29, 1903.
NO MODEL. 8 SHEETS—SHEET 8.

WITNESSES:
Edward Thorpe
Isaac B. Owens

INVENTOR
Charles W. Richards
BY
ATTORNEYS.

No. 766,064. Patented July 26, 1904.

UNITED STATES PATENT OFFICE.

CHARLES W. RICHARDS, OF CLEVELAND, OHIO, ASSIGNOR TO ACME MACHINERY COMPANY, OF CLEVELAND, OHIO.

RIVET-MAKING MACHINE.

SPECIFICATION forming part of Letters Patent No. 766,064, dated July 26, 1904.

Application filed May 29, 1903. Serial No. 159,299. (No model.)

*To all whom it may concern:*

Be it known that I, CHARLES W. RICHARDS, a citizen of the United States, and a resident of Cleveland, in the county of Cuyahoga and State of Ohio, have invented a new and Improved Rivet-Making Machine, of which the following is a full, clear, and exact description.

This invention relates to a machine for automatically forming headed rivets from a continuous bar of iron, and one of the leading features of the invention lies in the provision of a stationary rivet-head die and a moving plunger which operates toward and from the die, carrying the rivet-blank to the die and withdrawing the rivet upon the completion of the formation thereof.

According to the form of the invention here illustrated the organized machine comprises a transversely-movable carrier, with suitable mechanism for imparting thereto regular reciprocations, this carrier mounting a knife for cutting the rivet-blanks from the continuous bar, and gripping devices for holding the blanks until they are engaged by the plungers. Two head-dies are provided, arranged one at each side of the center of movement of the carrier, and a plunger operates with each die, these plungers being suitably actuated to engage the rivet-blanks as they are brought to one side or the other, whereupon the grippers on the carrier release the blanks, and the plungers move the blanks forward to form the rivet-head. Said plungers include means for automatically ejecting the completed rivet. The apparatus involves various other features of more or less importance and all will be fully set forth hereinafter.

This specification is an exact description of one example of my invention, while the claims define the actual scope thereof.

Reference is to be had to the accompanying drawings, forming a part of this specification, in which similar characters of reference indicate corresponding parts in all the views.

Figure 1:
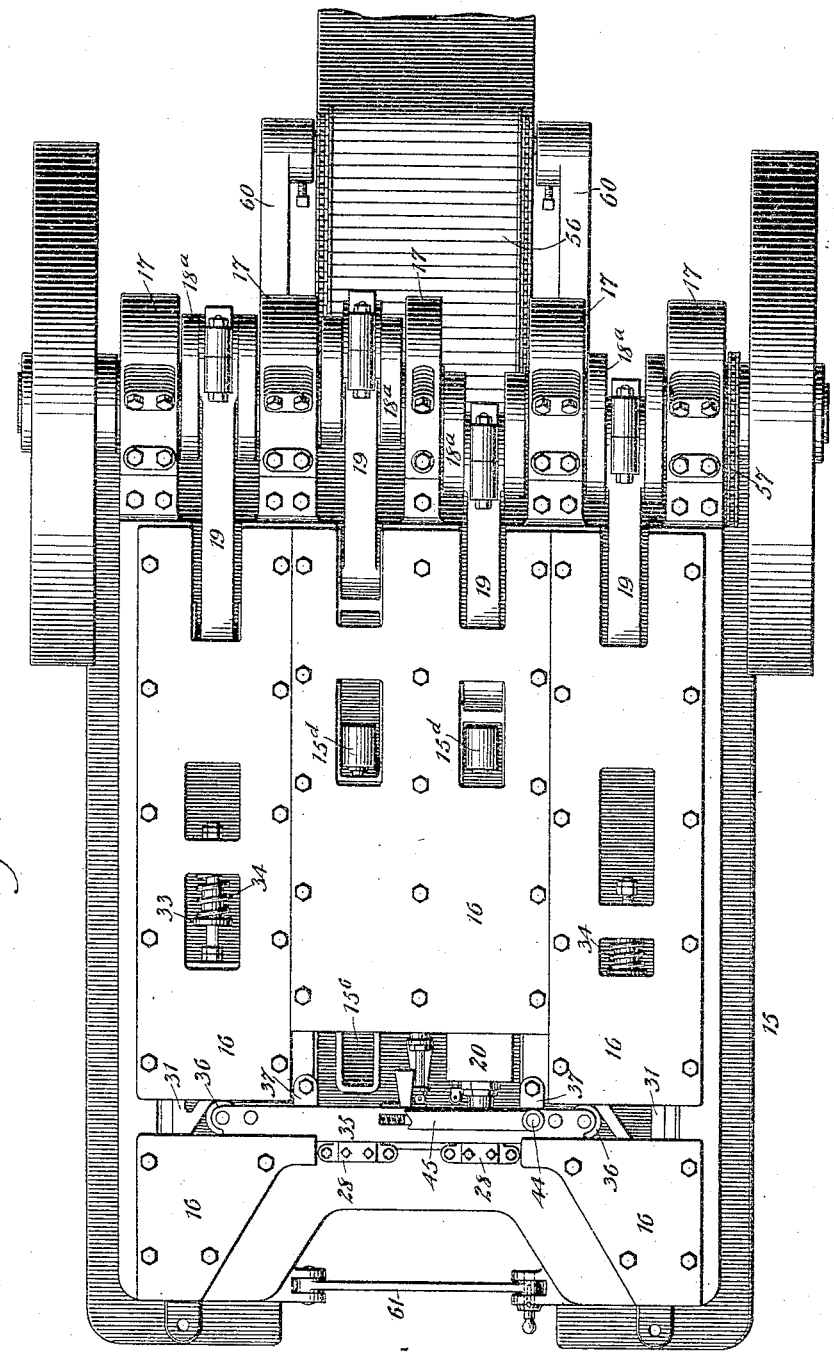

Figure 1 is a plan view of the machine. Fig. 2 is a similar view somewhat enlarged and illustrating the machine with the cover-plates removed and also illustrating the action of the safety device by which upon the clogging of the carrier or any of its connected parts a certain lost motion is allowed so as to prevent the destruction of any part of the machine. Fig. 3 is a side elevation of the machine on a reduced scale. Fig. 4 is a cross-section on the line 4 4 of Fig. 2. Fig. 5 is a longitudinal section on the line 5 5 of Fig. 2. Figs. 6, 8, and 10 are fragmentary plan views showing the carrier, the head-dies, and plungers in three successively-occurring positions. Figs. 7, 9, and 11 are rear elevations of the carrier, showing it in three successive positions, such positions coinciding, respectively, with the positions shown in Figs. 6, 8, and 10. Fig. 12 is a detail section illustrating the position of the dies and plungers during the instant at which the rivet-head is formed, and Fig. 13 is an enlarged section illustrating the gage for determining the length of the rivet.

The framing or body 15 of the apparatus may be of any suitable form and is formed on its upper surface with longitudinally-extending raised portions $15^a$, forming four longitudinal guides, and at the front end of the machine is a transversely-extending raised portion $15^b$, forming a wall against which the rivet-shaping devices operate, as will hereinafter fully appear. As shown best in Fig. 1, the top of the machine is covered by removable plates 16, which are bolted to the raised portions $15^a$ and $15^b$ and cover the major part of the working elements of the machine, and, as shown best in Figs. 2 and 12, the body is formed with two openings $15^c$, through which the finished rivets are dropped.

Mounted in suitable boxes 17, located on the rear end of the machine, is the drive-shaft 18, which is formed with four double cranks $18^a$ thereon, and with these cranks are respectively connected rods 19. Said rods extend longitudinally of the machine toward the front end thereof, and the two middle rods are joined to the plunger-slides 20, which are fitted in the two middle guideways before described, while the two side rods 19 are joined to the carrier-operating slides 21, mounted in the side guideways of the frame. The shaft 18 being suitably driven, the various slides 20 and 21 will be operated therefrom, and in this connection it will be observed that the end cranks 18ª are so placed as to reciprocate the carrier-operating slides 21 alternately—that is to say, one slide being thrown forward as the other is drawn backward—and the same arrangement obtains with respect to the plunger-slides, which are thereby made to act out of unison, one slide moving forward to form the rivet and the other slide moving rearward to eject the rivet and recover its position.

Figure 12:
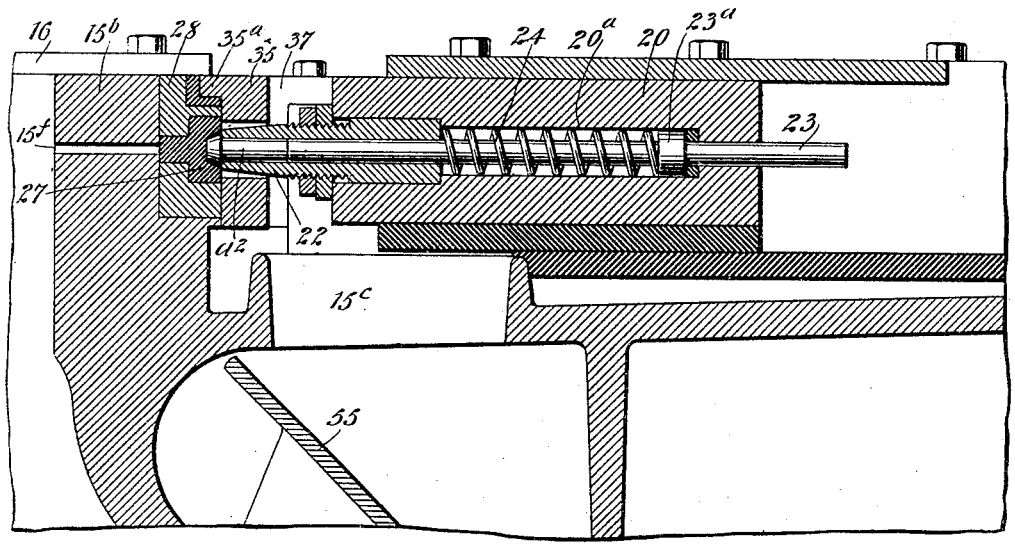
Figure 13:
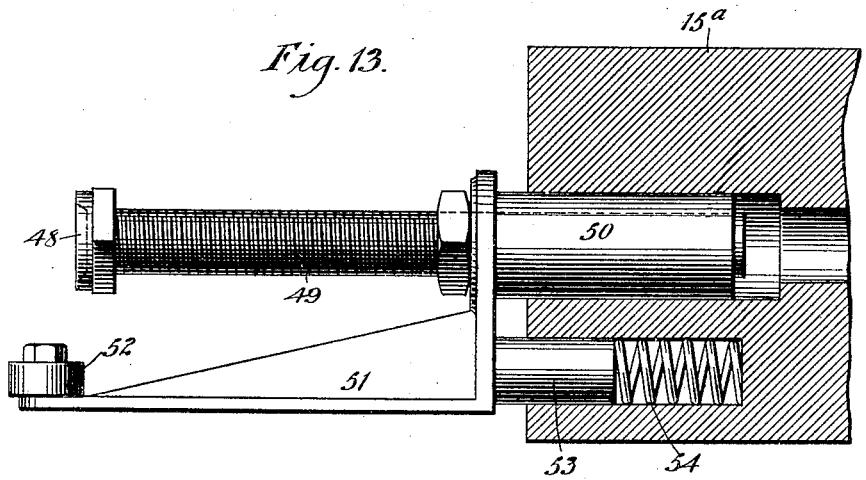

The plunger-slides 20, as best shown in Figs. 5 and 12, are formed with longitudinal passages 20ª, in the forward end of which are fastened the plungers 22, these plungers being tubular and having the ejector-rods 23 fitted to slide therein. Said rods are provided with collars 23ª, and between these collars and the rear ends of the plungers 22 expansive springs 24 operate. The rear ends of the plungers project into an opening 20ᵇ, formed in the slide, and are adapted to engage a wear-block 25, fastened to an upwardly-projecting stud 15ᵈ, formed on the framing of the machine. The spring 24 normally projects the ejectors 23 inward in the position shown in Fig. 12; but when the stop 15ᵈ is struck the spring 24 is pressed and the ejectors 23 are thrown outward, as shown in Fig. 5. This latter position occurs when the slide is at the limit of its rearward movement, and the former position occurs whenever the ejector is out of contact with the stop. The plungers 22 project forward of the slides 20, as illustrated, and are adapted to receive and press the rivet into the dies. Each slide 20 carries at its front end a bracket 29, of any suitable form, and said brackets are provided with rollers 30, these parts serving to operate certain elements of the carrier, as will be hereinafter fully set forth.

As indicated by the broken lines in Fig. 2, the raised portion 15ᵇ of the frame is formed with a longitudinally-extending opening 15ᵉ, constituting the blank-feeding point of the machine. This opening tapers toward the rear side of the wall or raised portion 15ᵇ and is adapted to have the bar of iron from which the rivets are formed passed through it, this bar being indicated at α in the drawings. Said opening 15ᵉ terminates at its inner end in a steel block 26, centrally orificed and let into the body of the machine, this block serving as a ledger-blade during the operation of cutting off the blank rivets from the bar α. At each side of the opening 15ª and at the inner face of the wall or raised portion 15ᵇ are located the two rivet-head dies 27, the form of which is best shown in Fig. 12. Said dies may be seated in the frame in any desired manner—for example, by the separate mountings indicated at 28. (See Figs. 2 and 12.) The wall or raised portion 15ᵇ is formed with openings 15ᶠ, which lie opposite the dies 27 and through which tools may be introduced to displace the dies when desired, so that they may be removed for repair or for the substitution of dies of different form.

The carrier-operating slides 21 have sliding cams 31 mounted at their front ends, said cams comprising parallel elevated and depressed surfaces 31ª and 31ᵇ, connected by inclined or cam proper surfaces 31ᶜ. The cams 31 have sliding connection with the slides 21, as shown, and attached to the cams are rods 32, which are fitted loosely in the slides 21 and have collars 33 adjustable thereon. Bearing between said collars and slides 21 are expansive springs 34, which constitute safety devices, mounting, as they do, the cams 31, so as to allow a slight longitudinal movement between the cams and their operating-slides. By this means should the machine become clogged the lost motion allowed will prevent the destruction of the parts of the machine. Fig. 2 illustrates these devices in operation, in which view the bottom cam is shown as having a movement relative to its slide 21, such movement being due to a relatively unyielding obstacle encountered by the cam referred to.

35 indicates the carrier, and this, as best shown in Fig. 12, has a forwardly-overhanging ledge 35ª, running on a suitable mount formed on the wall 15ᵇ of the frame of the machine, this carrier being thereby held to reciprocate longitudinally of itself and transversely of the machine. The ends of the carrier are provided with antifriction-rollers 36, which are engaged by the respective cams 31. When the inclined end portions 31ᶜ of said cams are running on the rollers 36, movement is imparted to the carrier 35; but when the parallel portions 31ª and 31ᵇ are running on the carrier the carrier is at rest. It will be observed that by this construction a slight pause in the movement of the carrier is provided for at the end of each reciprocation thereof, the purpose of which will be fully brought out hereinafter. At the rear side of the carrier are arranged two inverted-L-shaped backing-blocks 37, which prevent sidewise movement of the carrier and which are fastened to two of the raised portions 15ª of the frame. The carrier is formed with a horizontal opening 35ᵇ, extending longitudinally in the carrier, and in the center of this opening is located a pin 38, held by depending ears 35ᵇ, formed on the carrier. Said pin forms the fulcrum of two pairs of crossed gripper-jaws 39 and 40, the jaws 39 respectively coacting with the jaws 40, and connected with each pair of jaws and extended respectively upward and downward therefrom are arms 41, which extend through suitable openings formed in the carrier and project above the top and bottom faces thereof. By pushing these arms 41 rightward (see Fig. 11) the gripper-jaws are thrown open, and by pushing said arms leftward (see Fig. 7) the gripper-jaws are moved toward each other or into active position. Connected with each arm 41 and located in suitably-formed cavities in the carriers are pins 42, which carry stout expansive springs 43, said springs pressing the arms 41 leftward (see Fig. 7) and serving normally to close the jaws 39 and 40. Mounted in one end portion of the carrier is a vertical shaft 44, which projects above and below the carrier and has fastened to each end thereof an arm 45, said arms terminating in inclined end faces 45$^a$, engaged with the respective pins 41. The lower end of the shaft 44 also carries an arm 46, which has a rearwardly-extending widened free end 46$^a$, projecting rearward of the carrier and adapted to be engaged alternately by the before-described rollers 30, thereby imparting at certain periods in the cycle in the operation of the machine a rocking movement to the shaft 44 and causing the arms 45 to act on the pins 42 and throw them into the position shown in Fig. 11, thus compressing the springs 43 and opening the gripper-jaws 39 and 40. When the pressure on the lever 46 is relaxed, the springs 43 immediately assert themselves, and by the action of the inclined and engaging faces of the elements 41 and 45 the latter elements, 45, are thrown back to the position shown in Fig. 6 and the gripper-jaws 39 and 40 are moved into active position, as shown in Figs. 6 and 7.

At the front side of the carrier is located the knife 47, by which the rivet-blanks are severed from the bar of stock. (Indicated at $a$.) This knife is here illustrated in the form of a square plate of steel set into the front side of the carrier and extending across the middle of the opening 35$^a$ therein. The four sides of this plate are formed with the curved notches 47$^a$, which form the cutting edges proper. Only two of these cutting edges are active at one time, and the plate is capable of reversal to bring the other two edges into active position whenever desired. By this construction the length of the life of the knife is very much increased. Said knife lies flush with the rear face of the wall 15$^b$ and of the before-mentioned ledger-blade 26. The bar $a$ being projected through the opening in this ledger-blade, as the carrier advances one edge or the other of the knife, acting with the element 26, will sever a part of the bar to form the rivet-blank, which is indicated at $a'$ in Figs. 7, 9, and 11. It will be observed that the gripper-jaws 39 and 40 are located, respectively, at the two active sides of the knife, and as the carrier advances one side of the knife toward the bar $a$ the action of the elements 45 being so timed the gripper-jaws will be at once closed on the bar, and the knife simultaneously cuts off a part forming the rivet-blank, which is then held in the gripper-jaws. Fig. 7 shows the parts at this instant.

In order to regulate the length of the rivet, I provide the gage which is illustrated in Figs. 6, 8, 10, and 13. This gage is mounted on the middle raised portion or wall 15$^a$ of the frame, and it comprises a cup 48, adapted to be engaged by the inner end of the bar of iron and forming the gage proper. Said cup is carried by a threaded shank 49, which is adjustably fitted in a sleeve 50, and to said sleeve is attached an arm 51, projecting forwardly and carrying a roller 52, this roller lying at the rear vertical face of the carrier and being adapted to run thereon and on a projected portion or cam 35$^c$, formed on said face of the carrier. The sleeve 50 is mounted slidably in a longitudinally-disposed cavity formed in the said raised portion 15$^a$, and the bracket 51 has a rearwardly-projecting stud 53 sliding in said raised portion 15$^a$ and back of which stud is an expansive spring 54. This spring projects the gage forward, and by adjusting the parts 49 50 relatively to each other the position of the cup or gage proper, 48, may be adjusted at will. In operation the heated bar $a$ is pushed through the opening 15$^e$ and engaged with the gage 48, which limits the inward movement of the bar. A steady pressure should be kept on the bar; but the spring 54 should be of sufficient tension to resist the pressure. The end of the bar is received within the cup 48, and the tapered walls thereof act on the raw edge of the stock and round or even and slightly point the same, so as to insure its entry into the plungers 22, as will fully appear hereinafter. When the bar is severed to form the rivet-blank and this blank is moved sidewise by the carrier, it is necessary to move the gage rearward, so that the blank may clear the walls of the said cup 48. This is effected by the cam 35$^c$, which acts on the roller 52 and throws rearward the parts 51, 53, 50, 49, and 48, compressing at that time the spring 54.

Below the two discharge-openings 15$^e$ is arranged an inclined chute 55, and this delivers the completed rivets upon an endless carrier 56. This conveyer may be of any special construction and serves to carry the finished rivets to the rear of the machine. Said conveyer is driven by a sprocket-chain 57, running from a suitable gear on the shaft 18. The front end of the conveyer turns over sprocket-wheels 58, mounted in the bed of the frame of the machine, and the rear end runs over sprocket-wheels 59, carried by arms 60, attached to the frame and projecting rearwardly therefrom.

The operation of the apparatus may be traced as follows: The shaft 18 may be driven by any suitable means, and its rotary movement imparts the above-described reciprocation to the shafts 20 and 21. The operative in charge of the machine should push the bar $a$ through the opening 15$^e$, it being of course necessary properly to heat the bar. If desired, the bar may be rested on a transverse support 61, arranged in the front end of the machine. The bar on passing through the opening 15ᵉ will be projected through the opening 35ᵃ in the carrier and will strike the cup 48 of the gage. (See Fig. 6.) This gage limits the movement of the bar into the machine, and consequently by regulating the gage the length of the rivet may be controlled at will. Assuming the parts to be in the position shown in Figs. 6 and 7 and moving in the direction of the arrows applied thereto, it will be seen that the left-hand edge of the knife 47 will be engaged with the bar $a$, and as the movement of the slide continues a section of this bar will be severed. It also will be seen that the jaws 39 and 40 of the gripper are closed on the bar at the left-hand side of the pin 38, and as the knife severs a section of the bar said severed section is held in the gripper-jaws. The severed section of the bar then becomes the rivet-blank, as indicated at $a'$ in Figs. 8 to 11. The carrier 35 then continues its leftward movement until the position shown in Fig. 8 is reached, whereupon the rollers 36 will be running upon the parallel portions 31ᵃ and 31ᵇ of the cams 31 and the movement of the carrier will be arrested. During this operation the left-hand plunger 22 will have advanced from the position shown in Fig. 6 to that shown in Fig. 8, and said plunger will engage the end of the rivet-blank, said blank then lying directly opposite the left-hand head-die 27. The engagement of the plunger with the rivet-blank pushes the blank forward until its front end is entered into the die and simultaneously the rear end of the blank is entered into the plunger. Simultaneously with the above-described advance of the left-hand plunger 22 the left-hand roller 30 will be advanced, and said roller will engage the laterally-turned end 46ᵃ of the arm 46, throwing said arm into the position shown in Fig. 10. This causes the arms 45 to act on the arms 41, and the gripper-jaws 39 and 40 are opened, so as to leave the rivet-blank engaged between the die 27 and the plunger 22. At this period the movement of the cams 31 will have been reversed, (see the arrows in Fig. 10,) and this will cause the carrier 35 to resume its movement; but such movement will be rightward instead of leftward. As the carrier moves rightward the right-hand side of the knife 47 again engages the bar, a rivet-blank is severed therefrom, and said blank is taken to the right-hand side of the machine, where the above-described operations are repeated. After the left-hand plunger has advanced sufficiently to place the rivet-blank in the position shown in Fig. 10, the continual movement of the plunger will bring it up into engagement with the corresponding die 27, the shank of the rivet then lying wholly within the plunger and the rear end of said shank engaging the ejector-rod 23, which limits the inward movement of the blank. At this period the act of pressing or stamping the head of the rivet begins, and when the plunger reaches the limit of its forward movement (see Fig. 12) the finished rivet (indicated at $a^2$ in said view) will have been formed. The plunger now begins its return or rearward movement. The rivet is carried out of engagement with the die until the rivet reaches a position over the corresponding opening 15ᶜ. At this point the rear end of the ejector-rod 23 strikes the stop 25 and its movement is reversed; but the plunger continues to move rearward until it assumes the position shown in Fig. 5. This results in forcing the rivet out of engagement with the plunger, the rivet thereupon dropping out of the opening 15ᶜ onto the chute 55 and finally to the conveyer 56. From the position shown in Fig. 5 the plunger returns to its forward movement and the above-described cycle of operations will be repeated.

In connection with this machine it will be observed that the carrier moves steadily from one side to the other, with a slight pause at the end of each movement. Each time that the knife 47 moves past the bar $a$ a rivet-blank is severed from the bar, and these blanks are carried alternately to the right or to the left side of the machine. At each pause in the movement of the carrier a plunger advances and engages the rivet-blank, and upon the engagement of the plunger with the rivet-blank the gripper releases the blank, whereupon the actual dying or stamping operation begins. It will thus be seen that a rivet is always being formed at one side of the machine, while at the other side a complete rivet is being ejected. This provides for great rapidity in the operation of the machine, since there is no period during which any of the tools are idle, all movements of the plungers being utilized either in pressing up the rivet or in discharging the complete product. Should a bar $a$ be permitted to cool, so that the blade 47 cannot readily sever the rivet-blank, the destruction of any part of the machine will be prevented by the safety device, of which the springs 34 are the essential parts. The safety devices will also prevent clogging of the machine at other points resulting in the destruction of any part of the apparatus.

Various changes in the form, proportions, and minor details of my invention may be resorted to at will without departing from the spirit and scope thereof. Hence I consider myself entitled to all such variations as may lie within the intent of my claims.

Having thus described my invention, I claim as new and desire to secure by Letters Patent—

1. The combination with two operated means for shaping a blank, said means being spaced from each other, of a carrier, means for moving the carrier back and forth from one of the first-named means to the other, a gripping device on the carrier, said gripping device releasably engaging the blanks, for the purpose specified, a knife mounted on the carrier and a ledger-blade coacting with the knife to sever the blanks from the stock.

2. The combination with two operated means for shaping blanks, said means being spaced from each other, of a carrier, means for reciprocating the carrier back and forth between the said means first named, a knife mounted on the carrier and having an edge at each side, a double-edged ledger-blade coacting with the knife to sever a blank from the stock upon each movement of the carrier, and gripping-jaws respectively adjacent to each edge of the knife and engaging the blanks as they are severed from the stock.

3. The combination of a plurality of dies, plungers respectively therefor, means for moving the plungers alternately with respect to each other toward and from the respective dies, a carrier, means for reciprocating the same back and forth between the plungers, gripping devices on the carrier to engage the blanks and to carry them to the plungers, and means for automatically operating the gripping devices in time with the carrier movements, said means comprising elements connected to and moving with the plungers.

4. The combination of two dies, plungers respectively therefor, means for moving the plungers toward and from the dies, a carrier, means for operating the carrier to move back and forth between the plungers in time therewith, gripping devices on the carrier, means for automatically operating the gripping devices, a knife on the carrier and a ledger-blade coacting with the knife to sever the blanks from the stock.

5. The combination of two dies, plungers respectively therefor, means for moving the plungers toward and from the dies, a carrier, means for operating the carrier to move back and forth between the plungers, gripping devices on the carrier, means for automatically operating the gripping devices, and a knife on the carrier and a ledger-blade coacting with the knife to sever the blanks from the stock, the means for automatically operating the gripper comprising parts adapted to be actuated from the plungers.

6. The combination with two separated means for shaping blanks, of a carrier movable back and forth between the same, a double-edged knife mounted on the carrier, and a double-edged ledger-blade coacting with the knife, for the purpose specified.

7. The combination with two separated means for shaping blanks, of a carrier movable back and forth between the same, a double-edged knife mounted on the carrier, a double-edged ledger-blade coacting with the knife, for the purpose specified, and gripper devices for the respective edges of the knife.

8. The combination with two separated means for shaping blanks, of a carrier movable back and forth between the same, a double-edged knife mounted on the carrier, a double-edged ledger-blade coacting with the knife, for the purpose specified, and gripper devices for the respective edges of the knife, said gripper devices comprising jaws and means for moving them automatically toward and from each other.

9. The combination of a die, a plunger movable toward and from the same, a carrier movable toward and from the plunger, a gripper on the carrier, operating devices for the gripper, an arm in connection with the operating devices, and a member connected to and moving in time with the plunger and serving periodically to operate the arm.

10. The combination of means for shaping a blank, a carrier movable toward and from the same, a gripper mounted on the carrier, cam-shaped arms mounted to swing on the carrier and engaging parts of the gripper to operate the same, an additional arm in connection with the first-named arms, and a member carried by a mobile part of the means for shaping the blank, said member engaging the said additional arm, for the purpose specified.

11. The combination with means for shaping a blank, of a carrier movable toward and from the same, gripping devices mounted on the carrier and comprising two arms projected through opposite sides of the carrier, two arms pivoted on the carrier and having cam-shaped ends engaging the arms first named, and means for operating the last-named arms in unison with the operation of the said means for shaping the blank.

12. The combination of means for shaping a blank, a carrier movable toward and from the same, a pair of gripper-jaws movable toward and from each other and mounted on the carrier, springs pressing said jaws into active position, means for moving the jaws against the springs into inactive position, said means comprising swinging arms mounted on the carrier and having cam-shaped ends engaging parts of the gripper-jaws, an additional arm in connection with said swinging arms, and an operating member for the said additional arm, said operating member having connection with a mobile part of the means for shaping the blank.

13. The combination with two means for shaping the blanks, said means being spaced from each other, of a carrier reciprocal back and forth between said means, a double-edged knife on the carrier, and a double-edged ledger-blade stationary with respect to the knife and carrier.

14. The combination with two means for shaping the blanks, said means being spaced from each other, of a carrier reciprocal back and forth between said means, a double-edged knife in the carrier, a double-edged ledger-blade stationary with respect to the knife and carrier, means at each edge of the knife for gripping the blank, and devices for automatically operating the gripping means.

15. The combination with a die, of an operated slide, a tubular plunger thereon, an ejector-rod movable in the plunger, a stop for the ejector-rod, and a spring holding the ejector-rod yieldingly in inactive position.

16. The combination with two operated means for shaping a blank, said means being spaced from each other, of a carrier, means for moving the carrier back and forth from one of such means to the other, means on the carrier for cutting off the blanks from a length of stock, and a gripping device on the carrier, said gripping device releasably engaging the blanks.

17. The combination with two separated means for shaping blanks, of a carrier movable back and forth between the same, for the purpose specified, and means on the carrier for cutting the blanks from the stock and for releasably gripping the blanks.

18. The combination with a frame and a driving element thereon, of two dies mounted on the frame, a plunger for each die, means for operating the plunger from said driving element, a carrier movable back and forth between the plungers and having devices for delivering blanks thereto, means on the carrier for cutting off the blanks from a length of stock, a cam at each end of the carrier, and means connecting the cams with the said driving element alternately to operate the cams, whereby to impart a reciprocal movement to the carrier.

19. A rivet-making machine, comprising the combination, with a frame and with a revoluble prime mover mounted therein, of two dies, plungers respectively coacting therewith, slides carrying the plungers and having connection with the prime mover to be operated alternately with respect to each other, additional slides also having connection with the prime mover to be operated alternately thereby, a cam carried by each additional slide, a carrier lying between said cams and respectively driven thereby, means on the carrier for cutting off the blanks from a length of stock, and devices on the carrier for delivering blanks alternately to the said plunger.

20. The combination with a frame having a portion therein constituting a blank-feeding point, of two operated means for shaping blanks, a blank-carrier mounted on the frame and movable from said blank-feeding point first to one shaping means and then to the other, whereby to deliver the blanks from the blank-feeding point alternately to the shaping means, means for so driving the carrier, and means on the carrier for cutting off the blank from a length of stock.

21. The combination of two operated blank-shaping means, a carrier movable back and forth between the two, means for driving the carrier, a blank-gripping device on the carrier, and means for automatically actuating the blank-gripping device alternately by the blank-shaping means as the carrier approaches the same.

22. The combination of two operated blank-shaping means, each comprising a mobile part, a carrier movable between the blank-shaping means, means for driving the carrier, a blank-gripping device on the carrier, and means for operating the blank-gripping device, said means including a part moving in unison with the carrier alternately into the paths of the said mobile parts of the blank-shaping means to be actuated thereby.

23. The combination of two blank-shaping means, each comprising a mobile part, a carrier movable between the blank-shaping means, means for driving the carrier, blank-gripping jaws mounted on the carrier, means yieldingly pressing the jaws into active position, a swinging member mounted on the carrier and adapted to move the jaws into inactive position, and an arm in connection with the swinging member and moving with the carrier alternately into the paths of the said mobile parts of the blank-shaping means to be actuated therefrom.

24. The combination of two operated blank-shaping means, a carrier movable between the two, means for driving the carrier, a gripper comprising two mobile parts mounted on the carrier, two swinging members having cam-shaped portions respectively for operating the said mobile parts of the gripper in one direction, means for exerting a yielding pressure on the gripper in the other direction, and an arm in connection with said swinging members and moved by the carrier alternately into proximity to the blank-shaping means to be actuated by a part thereof.

25. The combination of an intermediately-recessed blank-carrier, operated means for shaping blanks, said means including a part working in the recess in the carrier, and means operating at each end of the carrier, to drive the same, said carrier serving to deliver blanks to the blank-shaping means.

26. The combination of a recessed blank-carrier, means at each end of the carriage for operating the same, a die mounted at one side of the path of movement of the carrier, a plunger mounted at the other side and movable through the recess in the carrier, and means for reciprocally driving the plunger.

27. The combination of a yieldingly-sustained cupped blank-gage, a driven blank-carrier, and means for automatically retracting the gage as the carrier engages the blank.

28. The combination of a yieldingly-sustained cupped blank-gage, a driven blank-carrier, and means for automatically retracting the gage as the carrier engages the blank, said means comprising a part moving with the carrier and periodically acting on the gage.

29. The combination of a yieldingly-sustained cupped gage, an arm connected thereto, and a driven blank-carrier having a cam thereon adapted periodically to engage the arm for the purpose specified.

30. In a rivet-making machine, the combination with the frame and blank-shaping means, of a ledger-blade, a yieldingly-sustained cupped blank-gage, a driven carrier, a shear-blade thereon, and means for automatically retracting the gage as the shear-blade engages the blank.

31. In a rivet-making machine, the combination with a frame, of a stationary head-forming die mounted thereon, a reciprocating carrier having an opening between its ends, and provided with means for delivering the blank to the die, means at each end of the carrier for operating the same, a tubular plunger movable toward and from the stationary die and adapted to operate through the opening in the carrier, said tubular plunger receiving the major portion of the blank and moving the end of the blank into the die, for the purpose specified, and means for operating the plunger.

32. In a rivet-making machine, the combination with the frame, of a stationary die mounted thereon, a carrier having a recess intermediate its ends, means operating at each end of the carrier to impart a reciprocal movement thereto, means on the carrier for delivering a blank to the die, a plunger movable through the recess in the carrier toward and from the die, and means for operating the plunger.

33. In a rivet-making machine, the combination with two operated means for shaping a blank, of a carrier mounted to reciprocate between said means alternately to deliver blanks thereto, a cam at each end of the carrier to operate the same, each cam comprising plane, longitudinally-extending surfaces connected by an inclined surface, whereby to allow the carrier to dwell at the end of each movement, and means for operating the cams.

34. The combination with a die of an operated slide, a tubular plunger thereon, an ejector-rod movable in the plunger, a stop for the ejector-rod, and a means for holding the ejector-rod yieldingly in inactive position.

In testimony whereof I have signed my name to this specification in the presence of two subscribing witnesses.

CHARLES W. RICHARDS.

Witnesses:
M. MILLARD,
KATHERINE L. SMITH.